US 8,428,560 B2

(12) United States Patent
Matsumoto et al.

(10) Patent No.: US 8,428,560 B2
(45) Date of Patent: Apr. 23, 2013

(54) MOBILE TELEPHONE HAVING BROADCAST RECEPTION FUNCTION

(75) Inventors: Fumiaki Matsumoto, Higashiosaka (JP); Michiaki Koizumi, Daito (JP)

(73) Assignee: Kyocera Corporation, Kyoto (JP)

( * ) Notice: Subject to any disclaimer, the term of this patent is extended or adjusted under 35 U.S.C. 154(b) by 1431 days.

(21) Appl. No.: 11/579,486

(22) PCT Filed: May 10, 2005

(86) PCT No.: PCT/JP2005/008532
§ 371 (c)(1),
(2), (4) Date: Nov. 3, 2006

(87) PCT Pub. No.: WO2005/109831
PCT Pub. Date: Nov. 17, 2005

(65) Prior Publication Data
US 2009/0017792 A1 Jan. 15, 2009

(30) Foreign Application Priority Data
May 12, 2004 (JP) .................. 2004-142552

(51) Int. Cl.
*H04M 1/725* (2006.01)
(52) U.S. Cl.
USPC .................. 455/412.2; 455/550.1
(58) Field of Classification Search .......... None
See application file for complete search history.

(56) References Cited

U.S. PATENT DOCUMENTS

| | | | | |
|---|---|---|---|---|
| 6,108,316 A * | 8/2000 | Agrawal et al. | ............ | 370/311 |
| 2001/0056547 A1 * | 12/2001 | Dixon | ............ | 713/200 |
| 2002/0087973 A1 * | 7/2002 | Hamilton et al. | ............ | 725/32 |
| 2003/0066086 A1 * | 4/2003 | Tanaka et al. | ............ | 725/105 |
| 2003/0070182 A1 * | 4/2003 | Pierre et al. | ............ | 725/135 |
| 2003/0142958 A1 * | 7/2003 | Matsunaga et al. | ............ | 386/93 |
| 2003/0153366 A1 * | 8/2003 | Nagata | ............ | 455/567 |
| 2004/0204145 A1 * | 10/2004 | Nagatomo | ............ | 455/566 |

FOREIGN PATENT DOCUMENTS

| | | |
|---|---|---|
| CN | 1122169 A | 7/1995 |
| CN | 1288202 A | 3/2001 |
| CN | 1130788 C | 12/2003 |
| JP | 2000-196776 | 7/2000 |
| JP | 2002-288084 | 10/2002 |

(Continued)

OTHER PUBLICATIONS

Electronic Translation of JP 2004-282537, publication date Oct. 2004.*

(Continued)

*Primary Examiner* — Rafael Pérez-Gutiérrez
*Assistant Examiner* — German Viana Di Prisco
(74) *Attorney, Agent, or Firm* — Duane Morris LLP

(57) ABSTRACT

A mobile phone includes: a television broadcast receiving unit 111 operable to receive a broadcast program; a video processing unit 104 operable to output the received broadcast program; a wireless unit 102 operable to receive incoming-mail information; and a control unit 115 operable to monitor, during the output of the broadcast program, whether a predetermined condition for providing notification of the incoming-mail information is satisfied, and if the predetermined condition is satisfied when the incoming-mail information is detected, to provide the notification of the incoming-mail information, and if the predetermined condition is not satisfied when the incoming-mail information is detected, to postpone the notification of the incoming-mail information until the predetermined condition has been satisfied.

8 Claims, 10 Drawing Sheets

FOREIGN PATENT DOCUMENTS

| JP | 2003-46601 | 2/2003 |
| JP | 2003-319020 | 11/2003 |
| JP | 2004-72472 | 3/2004 |
| JP | 2004-282537 | * 10/2004 |

OTHER PUBLICATIONS

Machine translation of Iwao ( JP2002-288084).*

* cited by examiner

FIG. 2

| MAIL ORIGINAOR NAME | MAIL ADDRESS |
|---|---|
| TARO INOUE | △△△△@A. ne. jp |
| GORO SANYO | ×△××@ABC. ne. jp |
| KEIKO NISHIMURA | ○○××@kk. ne. jp |
| SABURO MATSUI | △△○○@MM. ne. jp |
| ⋮ | ⋮ |

FIG. 4

```
           MAIL IS RECEIVED.

TITLE                MAIL ADDRESS
TOMORROW'S MEETING   ×△××@ABC.ne.jp
```

MOBILE TELEPHONE HAVING BROADCAST RECEPTION FUNCTION

FIELD OF THE INVENTION

The present invention relates to a mobile phone having a broadcast reception function, and particularly to an art for controlling incoming-mail notification during broadcast reception.

BACKGROUND ART

Mobile phones rapidly have become multifunctional in recent years, and mobile phones having various accessory functions have become available such as a broadcast reception function, a camera function, and a game function.

With such multifunctionalization of mobile phones, there have been increased opportunities for a user to use the above-mentioned accessory functions of a mobile phone.

Accordingly, if the user receives an incoming-mail etc. from an external terminal during use of the accessory functions, processing based on an original function of the mobile phone needs to be performed so as not to make the user feel inconvenience.

In Japanese Patent Application Publication No. 2003-319020, an art relating to a mobile terminal is disclosed. According to this art, when interruption occurs, such as reception of an incoming-call or an incoming-mail during play of a game, the mobile terminal can notify a user of the reception in a desired notification method.

Therefore, the user can find that the incoming-call or the incoming-mail has been received without suspension of the game caused by an undesired notification method.

DISCLOSURE OF THE INVENTION

The Problems the Invention is Going to Solve

However, the above-mentioned art is an art for providing notification of an incoming-call etc. by selecting a notification method in accordance with an activation status of application software such as a game. Accordingly, this art cannot be directly applied to a case where a broadcast reception function is performed and thereby a received broadcast program is being output. Therefore, a measurement to meet the above case is needed.

In order to solve the above problem, the present invention aims to provide a mobile phone having a broadcast reception function capable of notifying a user of an incoming-call etc. without making the user feel inconvenience.

Means for Solving the Problem

In order to solve the above problem, the present invention is a mobile phone comprising: a broadcast receiving unit operable to receive a broadcast program; a broadcast output unit operable to output the received broadcast program; a detection unit operable to detect incoming-mail information; a monitor unit operable to monitor, during the output of the broadcast program, whether a predetermined condition for providing notification of the incoming-mail information is satisfied; and a notification control unit operable, if the predetermined condition is satisfied when the incoming-mail information is detected, to provide the notification of the incoming-mail information, and if the predetermined condition is not satisfied when the incoming-mail information is detected, to postpone the notification of the incoming-mail information until the predetermined condition has been satisfied.

EFFECT OF THE INVENTION

With the above structure, the present invention can control a notification timing of incoming-mail information, if the incoming-mail information is detected during output of a broadcast program, depending on whether a predetermined condition is satisfied when the incoming-mail information is detected. Therefore, by setting a predetermined condition in a mobile phone, such as a condition to allow notification of incoming-mail information during output of a broadcast program and a condition to need the notification of the incoming-mail information during the output of the broadcast program, the notification of the incoming-mail information can be provided at a time when a user does not feel inconvenience.

Here, the predetermined condition may include any one of the following conditions: that the broadcast program is a specific broadcast program; that a reception level of the broadcast program is no more than a threshold value; that a remaining amount of a battery is no more than a threshold value; that a broadcast channel switch instruction is input; that a broadcast reception end instruction is input; that a mail originator indicated by the detected incoming-mail information is a specific originator; that a number of pieces of detected incoming-mail information unnotified by the notification control unit is greater than a threshold value.

With the above structure, the following various effects can be achieved.

(1) Notification of incoming-mail information can be provided during output of a specific broadcast program, for example a CM broadcast program, which is unimportant for the user. Since the user is not disturbed by the notification of the incoming-mail information while watching a user's favorite broadcast program, the user can enjoy watching the favorite broadcast program.

(2) When a reception condition worsens while the user watches a broadcast program and thereby the user cannot watch the broadcast program, notification of incoming-mail information can be provided. Therefore, the notification of the incoming-mail information can be provided without making the user feel discomfort due to suspension of his watching.

(3) Once a remaining amount of a battery has become less, notification of incoming-mail information can be provided even during output of a broadcast program. Therefore, occurrence of the following inconvenience can be effectively prevented. For example, because of continuation of watching a broadcast program, a user cannot be notified of incoming-mail information that has been received during the continuation and finally the battery runs out.

(4) If a broadcast channel switch instruction or a broadcast reception end instruction is detected, notification of incoming-mail information can be provided. Therefore, when the user does not want to continue watching the broadcast program, that is, when the user does not feel interfered by suspension of the watching, notification of incoming-mail information can be provided.

(5) If a mail originator is a specific originator, notification of incoming-mail information can be provided once the incoming-mail information has been received even during output of a broadcast program. Therefore, occurrence of inconvenience can be effectively prevented where notification of incoming-mail information is delayed indicating that a mail has been received from an originator who is important for the user because of continuation of watching the broadcast program.

(6) Once the number of pieces of unnotified incoming-mail information has become greater than a threshold value, notification of unnotified incoming-mail information can be provided. Therefore, occurrence of the following inconvenience can be effectively prevented. For example, because of continuation of watching the broadcast program, a large number of received mails are left unnotified.

Here, if the predetermined condition is satisfied when the incoming-mail information is detected, the notification control unit provides the notification of the incoming-mail information in a first display mode, and if the predetermined condition is not satisfied when the incoming-mail information is detected, the notification control unit provides the notification of the incoming-mail information in a second display mode, and then provides the notification of the incoming-mail information in the first display mode once the predetermined condition has been satisfied.

With the above structure, if incoming-mail information is detected during output of a broadcast program, a notification method of the incoming-mail information can be controlled, depending on whether a predetermined condition is satisfied when the incoming-mail information is detected. Therefore, if incoming-mail information has been received, notification of the incoming-mail information can be provided in a display mode that does not make the user feel inconvenience. For example, if incoming-mail information is received during output of a user's favorite broadcast program, the incoming-mail information is displayed in a display mode that does not disturb the user watching the favorite broadcast program (for example, a display mode of a small icon only indicating that the incoming-mail information has been received). And, during output of another broadcast program, the incoming-mail information is displayed in a display mode indicating detail contents of a mail message.

BRIEF DESCRIPTION OF THE DRAWINGS

FIG. 2 shows a specific example of a specific originator list;

FIG. 4 shows an example of incoming-mail information displayed on a display unit 105;

Figure 1:
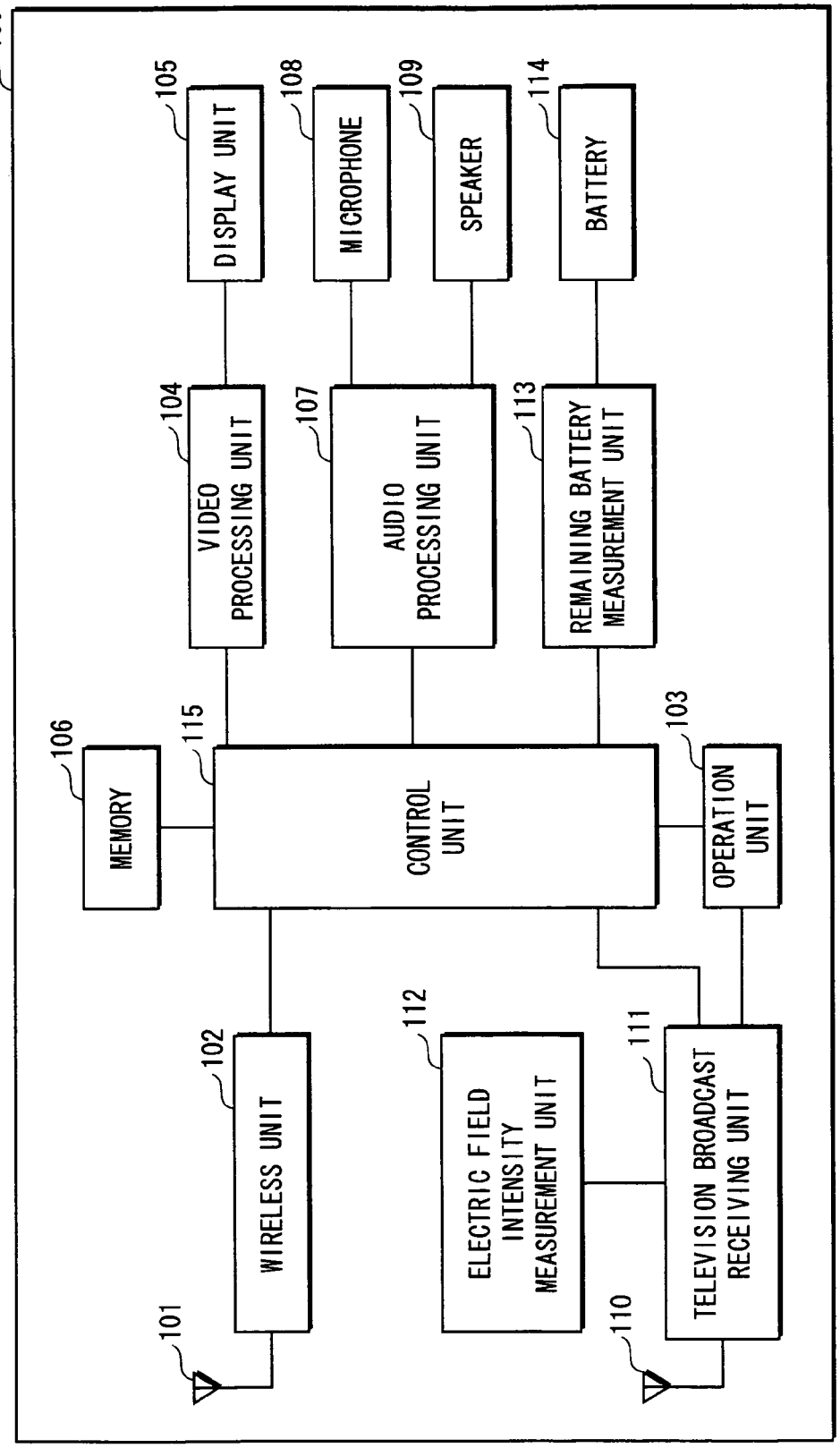
FIG. 1 is a functional block diagram showing a structure of a mobile phone 100 in a first embodiment of the present invention.

DESCRIPTION OF CHARACTERS 100 and 200: mobile phone
101: antenna
102: wireless unit
103: operation unit
104: video processing unit
105: display unit
106 and 206: memory
107: audio processing unit
108: microphone
109: speaker
110: broadcast receiving antenna
111: television broadcast receiving unit
112: electric field intensity measurement unit
113: remaining battery measurement unit
114: battery
115 and 215: control unit

BEST MODE FOR CARRYING OUT THE INVENTION (First Embodiment)
<Structure>
FIG. 1 is a functional block diagram showing a structure of a mobile phone 100 in a first embodiment of the present invention. As shown in FIG. 1, the mobile phone 100 includes an antenna 101, a wireless unit 102, an operation unit 103, a video processing unit 104, a display unit 105, a control unit 115, a memory 106, an audio processing unit 107, a microphone 108, a speaker 109, a broadcast receiving antenna 110, a television broadcast receiving unit 111, an electric field intensity measurement unit 112, a remaining battery measurement unit 113, and a battery 114.

The wireless unit 102 receives transmission signals including position information, incoming-mail information, a sound signal, text data, and image data that are transmitted from a base station (not shown) via the antenna 101, demodulates the transmission signals, and outputs the demodulated transmission signals to the control unit 115. The wireless unit 102 modulates various data including control data, audio data, text data, and image data that are input by the control unit 115, and transmits the modulated data to the base station via the antenna 101.

Here, "position information" indicates base station information defined in the second generation cordless telephone system standard RCR-STD-28 (RESEARCH AND DEVELOPMENT RADIO SYSTEM STANDARD-28). The position information includes a base station identifier that identifies a transmission source base station, an area number for identifying a call area to which the base station belongs, etc.

"Incoming-mail information" indicates information including a receiving date and time of an e-mail, a mail address of a sender, a mail address of a receiver, a title of the mail, transmission path information of the mail, etc. This information is described in a header of the mail. Here, when the mail intended for a mail address of the mobile phone 100 is transmitted from an external terminal to a mail server having the mail address recorded therein, the e-mail is transmitted from the mail server to the mobile phone 100 via the base station.

The operation unit 103 includes various keys for inputting various user instructions, such as a selection key and numeric keys of 0 to 9, receives the various user instructions via the various keys, and outputs the received instructions to the control unit 115. For example, the operation unit 103 receives the below-described various instructions from the user, such as a broadcast reception instruction for starting television broadcast reception, a broadcast reception channel switch instruction for switching a channel of a broadcast to be received, a broadcast reception end instruction for ending television broadcast reception. Then the operation unit 103 outputs the received instructions to the control unit 115.

The video processing unit 104 decodes video data such as text data and image data input by the control unit 115, converts the data into video analog signals, and outputs the video analog signals to the display unit 105.

The display unit 105 displays a text message and an image based on the video analog signals input by the video processing unit 104.

Specifically, the display unit 105 displays video based on video data that constitutes a television broadcast program, and displays a text message based on text data that constitutes incoming-mail information.

The memory 106 stores a threshold value of a broadcast receiving level, a threshold value of a remaining amount of a battery, the allowable number of unnotified incoming-mails, a specific originator list, positional information, etc.

Here, each threshold value of "broadcast receiving level" and "remaining amount of the battery" indicates a standard for judging whether to provide notification of incoming-mail information in the below-described incoming-mail notification control processing.

"The allowable number of unnotified incoming-mails" indicates the allowable maximum number of incoming-mails whose incoming-mail information is unnotified, which is a reference number for judging whether to provide notification of incoming-mail information in the below-described incoming-mail notification control processing.

"Specific originator list" indicates a list that shows correspondence of a name of an originator and a mail address of a mobile terminal of the originator in the case where an incoming-mail is received from the originator during reception of the broadcast program in the below-described incoming-mail notification control processing.

FIG. 2 shows a specific example of a specific originator list.

The audio processing unit 107 D/A converts an audio signal input by the television broadcast receiving unit 111, and outputs the D/A converted audio signal to the speaker 109. Also, the audio processing unit 107 A/D converts an audio signal input by the microphone 108, and outputs the A/D converted audio signal to the control unit 115.

Moreover, the audio processing unit 107 D/A converts audio data input by the control unit 115, and outputs the D/A converted audio data to the speaker 109.

The television broadcast receiving unit 111 receives a broadcast wave of a reception frequency instructed by the control unit 115 via the broadcast receiving antenna 110, and outputs the received broadcast wave to the electric field intensity measurement unit 112 and the control unit 115.

The electric field intensity measurement unit 112 measures an electric field intensity of the broadcast wave input by the television broadcast receiving unit 111, and outputs a result of the measurement to the control unit 115.

The remaining battery measurement unit 113 measures a supply voltage of the battery 113, and notifies the control unit 115 of a result of the measurement.

The control unit 115 includes a microprocessor, a ROM (Read Only Memory), a RAM (Random Access Memory), etc., and controls the whole mobile phone 100 in accordance with a control program stored in the ROM.

Moreover, the control unit 115 performs the below-described incoming-mail notification control processing in accordance with an incoming-mail notification control program stored in the ROM.

Furthermore, the control unit 115 separates video data and audio data from the broadcast wave input by the television broadcast receiving unit 111, outputs the video data to the video processing unit 104, and outputs the audio data to the audio processing unit 107. Also, the control unit 115 outputs video data input by the wireless unit 102 such as text data and image data to the video processing unit 104, and outputs audio data input by the wireless unit 102 to the audio processing unit 107.

Moreover, the control unit 115 detects a multiplex control signal from the separated audio data, and judges whether the broadcast wave is a stereo broadcast based on a frequency of the detected signal. Based on a result of the judgment, the control unit 115 judges whether a broadcast program being received is a CM broadcast program. Specifically, if the broadcast wave is judged to be a stereo broadcast, the control unit 115 judges the broadcast program being received is a CM broadcast program.

Moreover, the control unit 115 judges whether a receiving level of the broadcast being received is no more than the threshold value, based on a result of the electric field intensity measurement performed on the broadcast wave by the electric field intensity measurement unit 112.

Furthermore, the control unit 115 judges whether a remaining amount of the battery is no more than the threshold value, based on a result of the supply voltage measurement performed on the battery 113 by the remaining battery measurement unit 113.

<Operations>
(Incoming-Mail Notification Control Processing)

Figure 3:
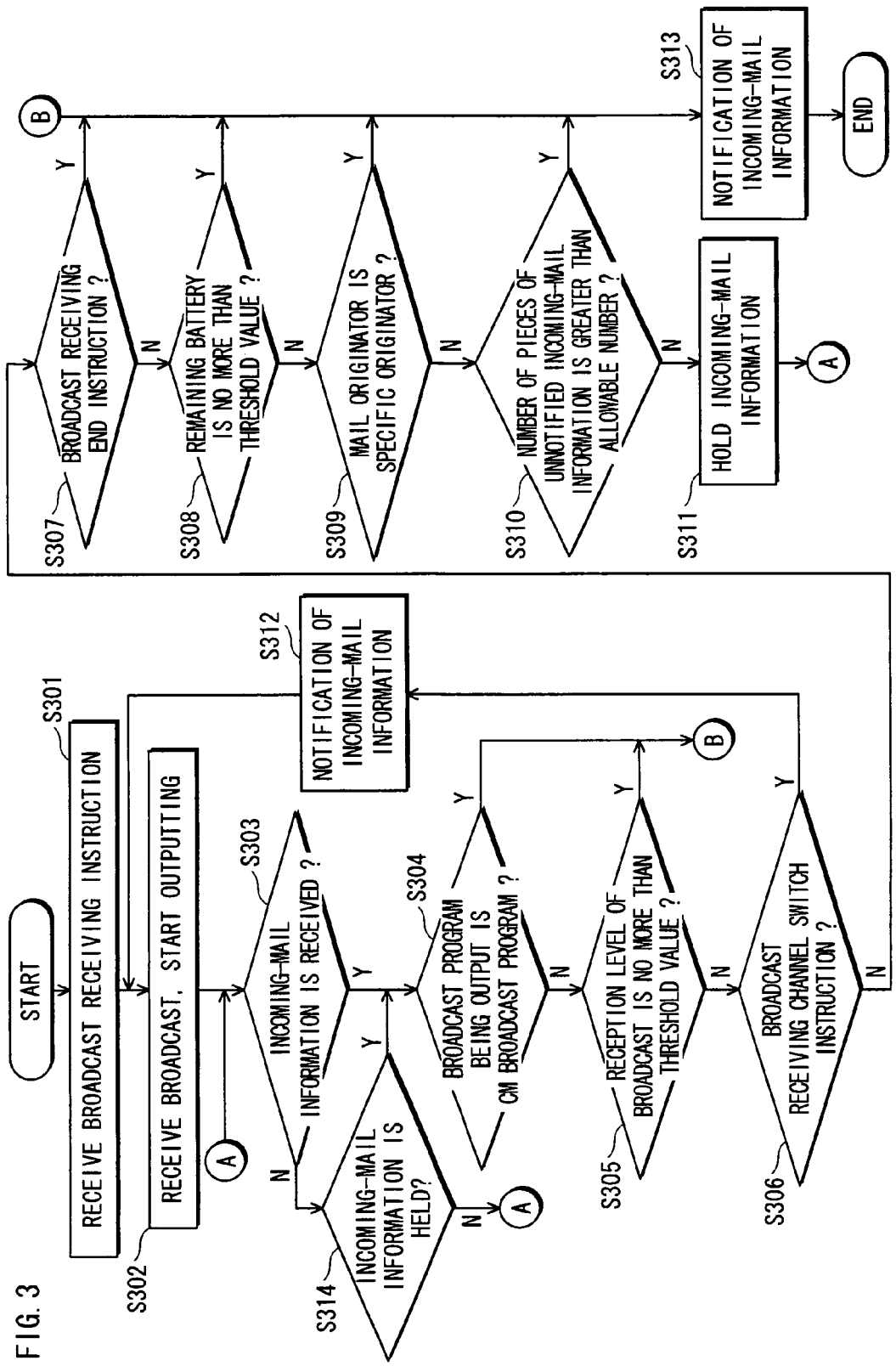
FIG. 3 is a flow chart showing operations of incoming-mail notification control processing performed by a control unit 115.

FIG. 3 is a flow chart showing operations of the incoming-mail notification control processing performed by the control unit 115. The operations are described with reference to FIG. 3.

Upon receiving a broadcast receiving instruction from a user via the operation unit 103 (Step S301), the control unit 115 causes the television broadcast receiving unit 111 to start receiving a broadcast. The control unit 115 starts outputting a received broadcast wave to the video processing unit 104 and the audio processing unit 107 (Step S302), and judges whether incoming-mail information has been received from the wireless unit 102 (Step S303).

If the incoming-mail information has been received (Step S303: Y), the control unit 115 judges whether a broadcast program being received is a CM broadcast program, based on a frequency of a multiplex control signal detected from the broadcast wave being received (Step S304).

If the broadcast program being received is a CM broadcast program (Step S304: Y), the control unit 115 outputs the input incoming-mail information to the video processing unit 104, and displays the incoming-mail information on the display unit 105 to provide notification of the incoming-mail information (Step S313).

Here, a display mode of the incoming-mail information on the display unit 105 may be a full-screen display mode or a partial-screen display mode.

FIG. 4 shows an example of incoming-mail information displayed on the display unit 105.

Also, if the broadcast being received is not a CM broadcast program (Step S304: N), the control unit 115 judges a receiving level of the broadcast being received is no more than a threshold value stored in the memory 106, based on a result of measurement of the electric field intensity of the broadcast wave input by the electric field intensity measurement unit 112 (Step S305).

If the receiving level of the broadcast being received is no more than the threshold value stored in the memory 106 (Step S305: Y), the processing proceeds to Step S313. If the receiving level is greater than the threshold value (Step S305: N), the control unit 115 further judges whether a broadcast receiving channel switch instruction has been input via the operation unit 103 (Step S306).

If the broadcast receiving channel switch instruction has been input (Step S306: Y), the control unit 115 outputs the input incoming-mail information to the video processing unit 104, and displays the incoming-mail information on the display unit 105 to provide notification of the incoming-mail information (Step S312). Then, the processing proceeds to Step S302. If the broadcast receiving channel switch instruction has not been input (Step S306: N), the control unit 115 further judges whether a broadcast receiving end instruction has been input via the operation unit 103 (Step S307).

If the broadcast receiving end instruction has been input (Step S307: Y), the processing proceeds to Step S313. If the broadcast receiving end instruction has not been input (Step S307: N), the control unit 115 further judges whether the remaining amount of the battery is no more than the threshold value, based on a result of the supply voltage measurement performed on the battery 113 by the remaining battery measurement unit 113 (Step S308).

If the remaining amount of the battery is no more than the threshold value stored in the memory 106 (Step S308: Y), the processing proceeds to Step S313. If the remaining amount of the battery is greater than the threshold value (Step S308: N), the control unit 115 identifies a mail address of a mail originator, based on the input incoming-mail information. The control unit 115 judges whether the mail originator indicated by the incoming-mail information is a specific originator, depending on whether a mail address that corresponds with the identified mail address is included in the specific originator list stored in the memory 106 (Step S309).

If the mail address that corresponds with the identified mail address is included in the specific originator list, the control unit 115 judges that the originator indicated by the incoming-mail information is the specific originator (Step S309: Y). Then, the processing proceeds to Step S313. If the mail address that corresponds with the identified mail address is not included in the specific originator list, the control unit 115 judges that the originator indicated by the incoming-mail information is not the specific originator (Step S309: N). The control unit 115 further judges whether the number of incoming-mails having unnotified incoming-mail information is greater than the allowable number of unnotified incoming-mails stored in the memory 106 (Step S310).

If the number of incoming-mails having unnotified incoming-mail information is greater than the allowable number of unnotified incoming-mails (Step S310: Y), the processing proceeds to Step S313. If the number of incoming-mails having unnotified incoming-mail information is no more than the allowable number of unnotified incoming-mails (Step S310: N), the control unit 115 holds the input incoming-mail information. Then the processing proceeds to Step S313.

In Step 303, if the incoming-mail information has not been received (Step S303: N), the control unit 115 judges whether the incoming-mail information is held (Step S314). If the incoming-mail information is held (Step S314: Y), the processing proceeds to Step S304. If the incoming-mail information is not held (Step S314: N), the processing proceeds to Step S303.

(Second Embodiment)

In the first embodiment, incoming-mail information is received during broadcast reception, the control unit 115 judges whether a broadcast program being received is a CM broadcast program. If the broadcast program being received is the CM broadcast program, the control unit 115 immediately displays the incoming-mail information on the display unit 105. In a second embodiment, different from the first embodiment, a control unit 215 judges whether a broadcast program being received is a user's favorite broadcast program. If the broadcast program being received is not the user's favorite broadcast program, the control unit 215 immediately displays incoming-mail information on a display unit 105.

The following mainly describes differences between the first embodiment and the second embodiment.

Figure 5:
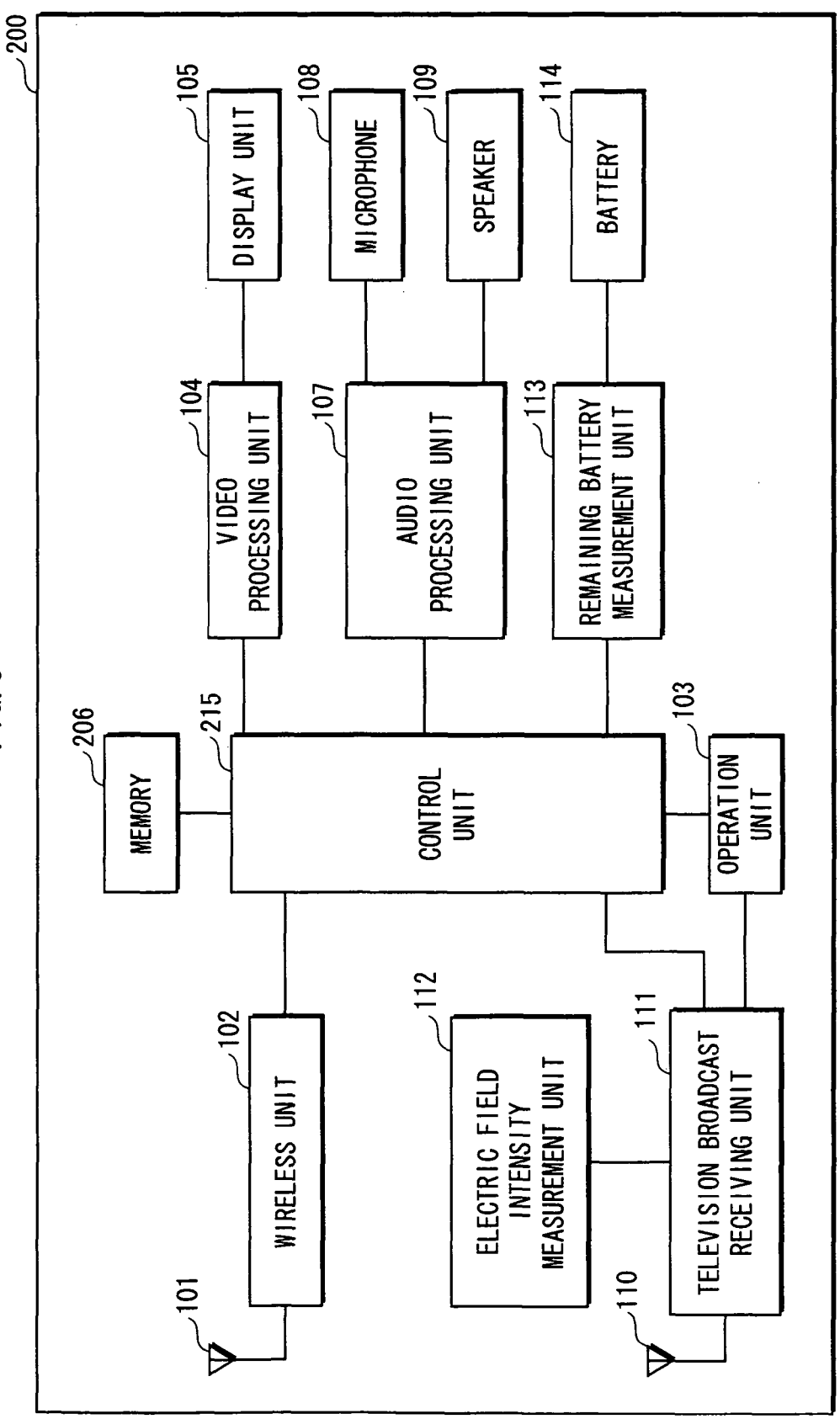
FIG. 5 is a functional block diagram showing a structure of a mobile phone 200 in a second embodiment of the present invention.

FIG. 5 is a functional block diagram showing a structure of a mobile phone 200 in the second embodiment of the present invention. As shown in FIG. 5, the mobile phone 200 includes an antenna 101, a wireless unit 102, an operation unit 103, a video processing unit 104, the display unit 105, the control unit 215, a memory 206, an audio processing unit 107, a microphone 108, a speaker 109, a broadcast receiving antenna 110, a television broadcast receiving unit 111, an electric field intensity measurement unit 112, a remaining battery measurement unit 113, and a battery 114.

The number is attached to the compositional elements of the mobile phone 200 in the second embodiment in the same way as the compositional elements of the mobile phone 100 in the first embodiment.

The memory 206 stores an address of a broadcast program search server and a favorite broadcast program list, in addition to the threshold value of the broadcast receiving level, the threshold value of the remaining amount of the battery, the allowable number of unnotified incoming-mails, the specific originator list, and the positional information, which are stored in the memory 106.

Here, "broadcast program search server" indicates a server connected with a data base that stores program information. The program information includes attributes of each broadcast program broadcasted within a predetermined period (for example, a genre to which the broadcast program belongs, an artist name who appears in the broadcast program, etc.), a broadcast program name, a broadcast time slot, a frequency of a broadcast station that broadcasts the broadcast program, etc. In accordance with a reception frequency and a current time that are transmitted via the mobile phone 200, the "broadcast program search server" searches a broadcast program name that corresponds to the reception frequency and the current time from the data base, and transmits the searched broadcast program name to the mobile phone 200. The broadcast program search server and the mobile phone 200 are connected with each other via an electronic communication line.

Also, the "favorite broadcast program list" indicates a list of names of user's favorite broadcast programs registered by the user beforehand.

The control unit 215 includes a time measurement unit 2051, and has functions different from those of the control unit 115 in the operations of the incoming-mail notification control processing.

The time measurement unit 2051 measures a current time, and notifies the control unit 215 of the measured current time.

Figure 6:
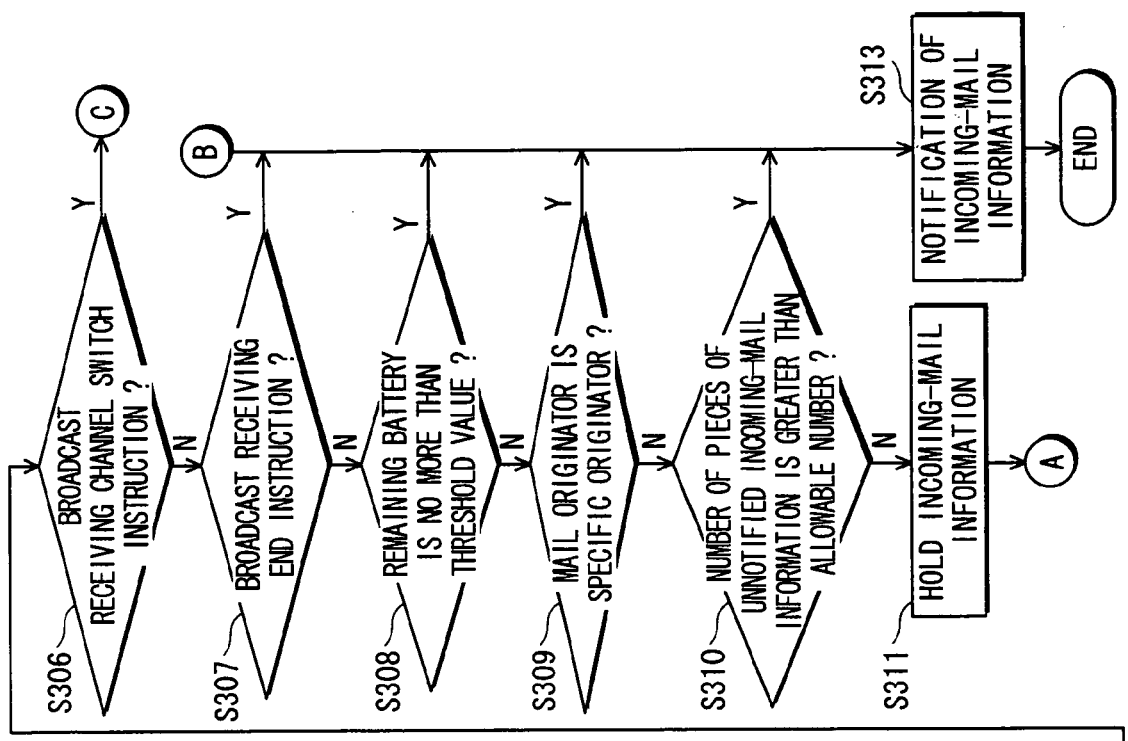
FIG. 6 is a flow chart showing operations of incoming-mail notification control processing performed by a control unit 215.
Figure 6:
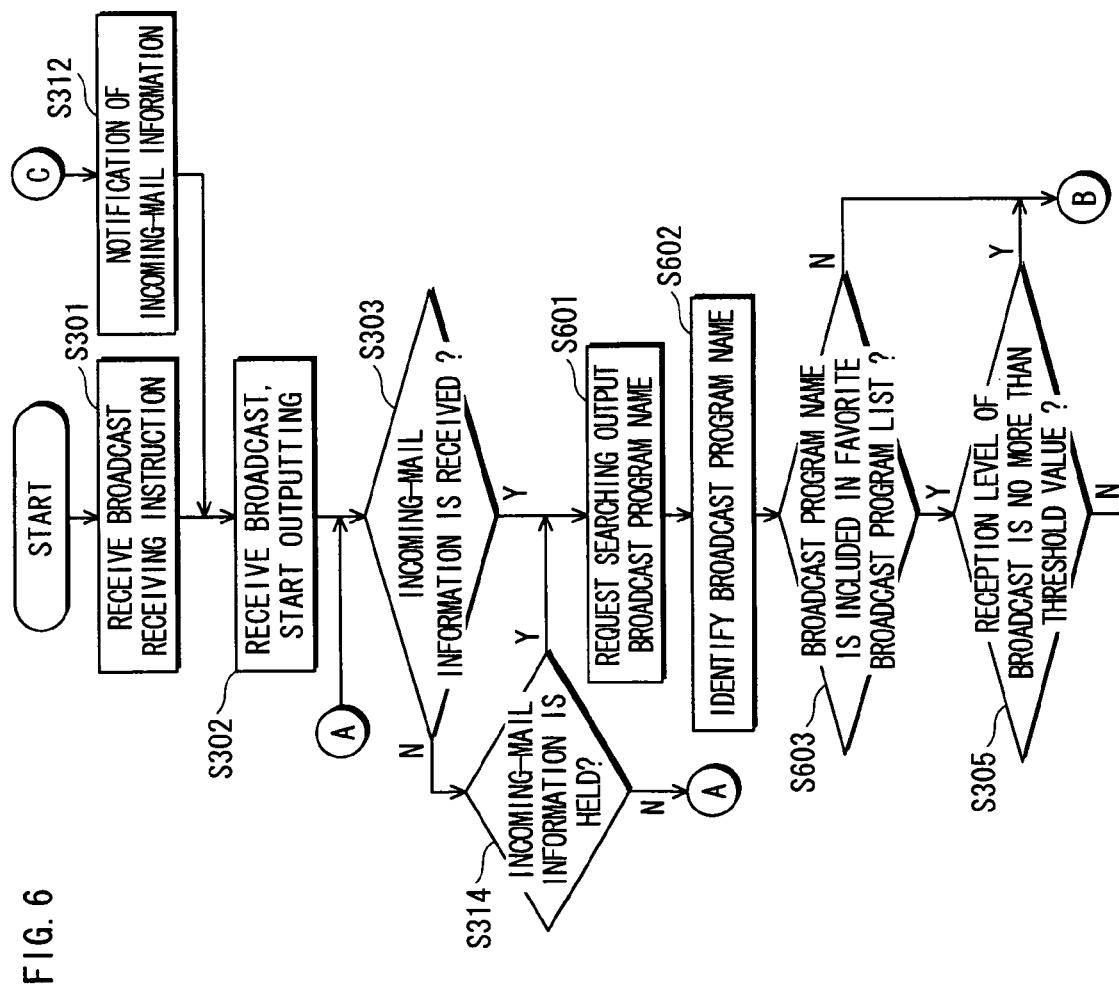

FIG. 6 is a flow chart showing the operations of incoming-mail notification control processing performed by the control unit 215. In FIG. 6, the same step number is attached to the same processing performed by the control unit 215 as the processing performed by the control unit 115 in FIG. 3.

The following describes differences between the operations performed by the control unit 115 and the operations performed by the control unit 215, with reference to FIG. 6.

In Step S303, if incoming-mail information has been received (Step S303: Y), the control unit 215 reads the address of the broadcast program search server stored in the memory 206. The control unit 215 connects to the broadcast program search server having the address via the wireless unit 102, acquires a current time from the time measurement unit 2051, and notifies the broadcast program search server of the acquired current time and a reception frequency of a broadcast being output to request the broadcast program search server to search a corresponding broadcast program name (Step S601). The control unit 215 identifies a corresponding broadcast program name, based on a result of the search transmitted from the broadcast program search server in response to the request (Step S602). The control unit 215 judges whether the identified broadcast program name is included in the favorite broadcast program list stored in the memory 206 (Step S603).

If the identified broadcast program name is not included in the favorite broadcast program list (Step S603: N), the processing proceeds to Step S313. If the identified broadcast program name is included in the favorite broadcast program list (Step S603: Y), the processing proceeds to Step S305.

Since the processing of Step S301 to Step S303 and Step S305 to Step S314 in FIG. 6 have already been described in the first embodiment, the description is omitted here.

<Supplementary Description>

While the mobile phone 100 and the mobile phone 200 according to the present invention have been described based on the embodiments, the present invention is not limited to the embodiments. (1) For example, in the first and second embodiments, in the incoming-mail notification control processing shown in FIG. 3 and FIG. 6, if a predetermined condition is satisfied, notification of incoming-mail information is provided. Also, if the predetermined condition is not satisfied, the notification of incoming-mail information is not provided. However, a notification method of the incoming-mail information may be changed depending on whether the predetermined condition is satisfied.

Two kinds of display data for indicating an incoming-mail, display data A and B, and the allowable number of unnotified mails are stored beforehand in the memory 106 and the memory 206, respectively. If a predetermined condition is satisfied, display is performed on the display unit 105 based on the display data A (for example, a text message that indicates a mail title and a mail originator) in a full-screen display mode or a partial-screen display mode. If the predetermined condition is not satisfied, display may be performed based on the display data B (for example, an icon image representing a mail) may be displayed in a small size on a corner of the display unit 105.

Here, "the allowable number of display unnotified mails" indicates the maximum number of mails allowable for unnotified status of incoming-mail information in a display mode based on the display data A in the above the switching control processing of the notification method of-the incoming-mail information.

Figure 7A:
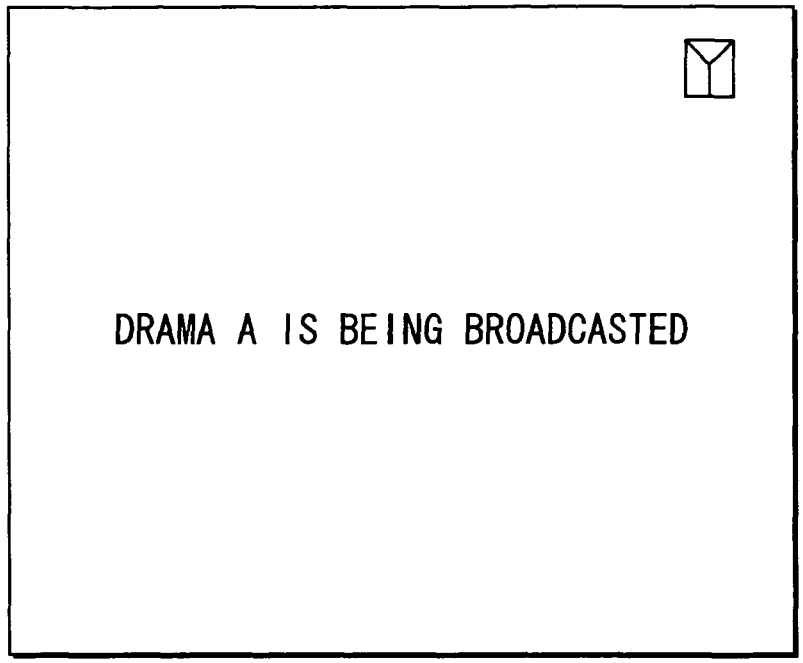
FIG. 7 shows specific examples of displays based on display data A and display data B.
Figure 7B:
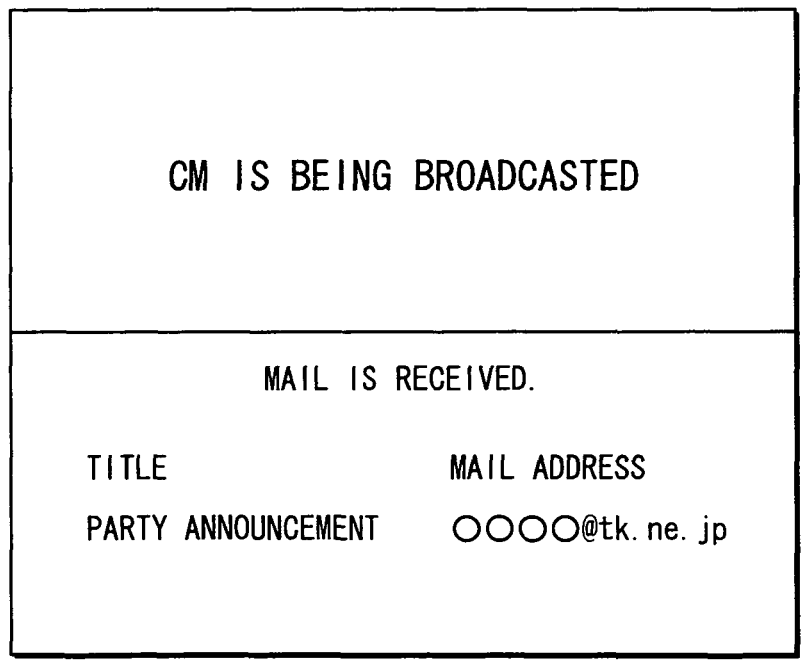

FIG. 7 shows specific examples of displays in the above cases. based on display data A and display data B. FIG. 7B shows a specific example of display based on the display data A (composite display of the display data A, a mail title and a mail address shown by the incoming-mail information is performed here). FIG. 7A shows a specific example of display based on the display data B.

Figure 8:
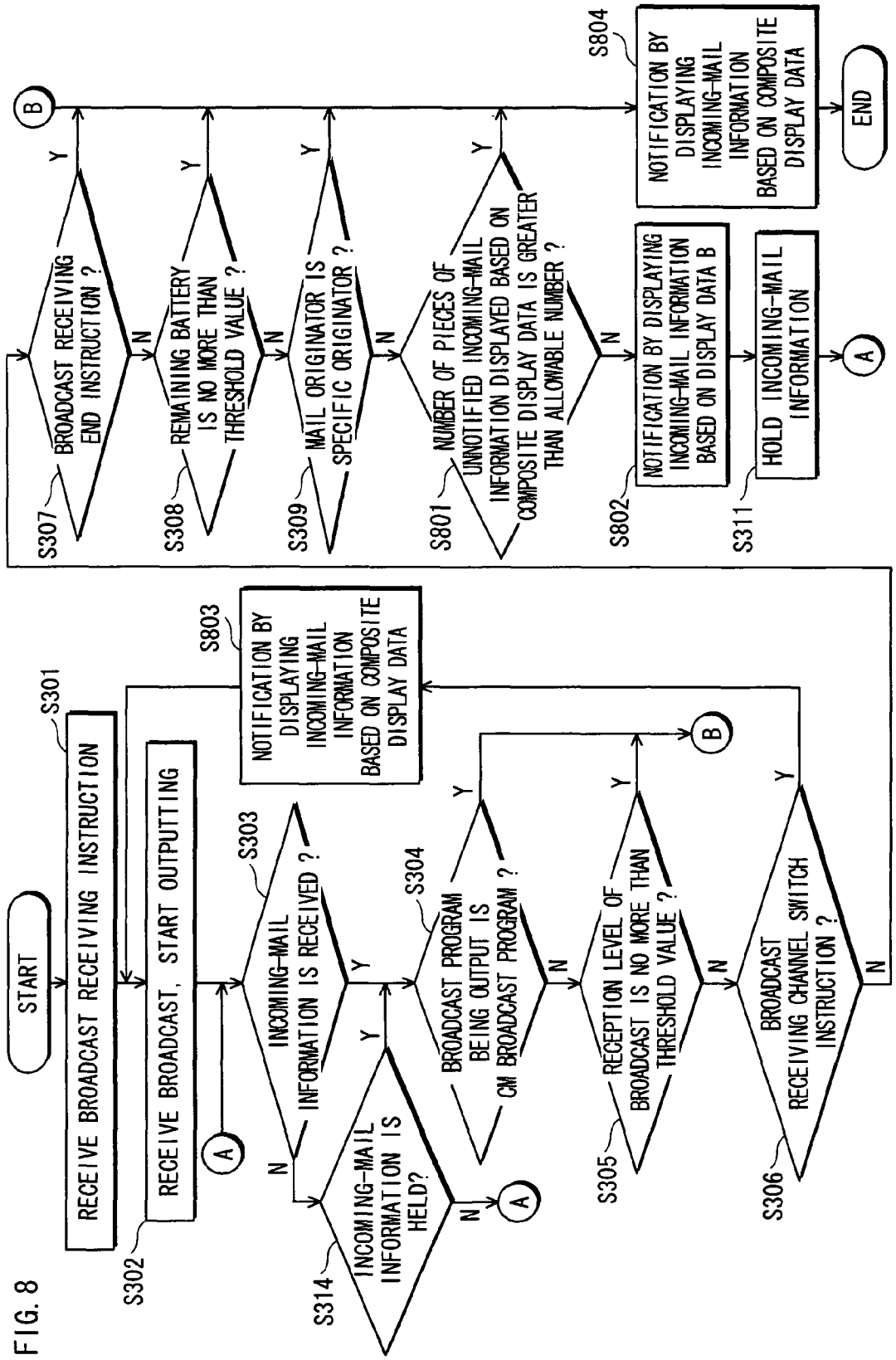
FIG. 8 is a flow chart showing operations of switching control processing of a notification method of incoming-mail information performed by the control unit 115.
Figure 9:
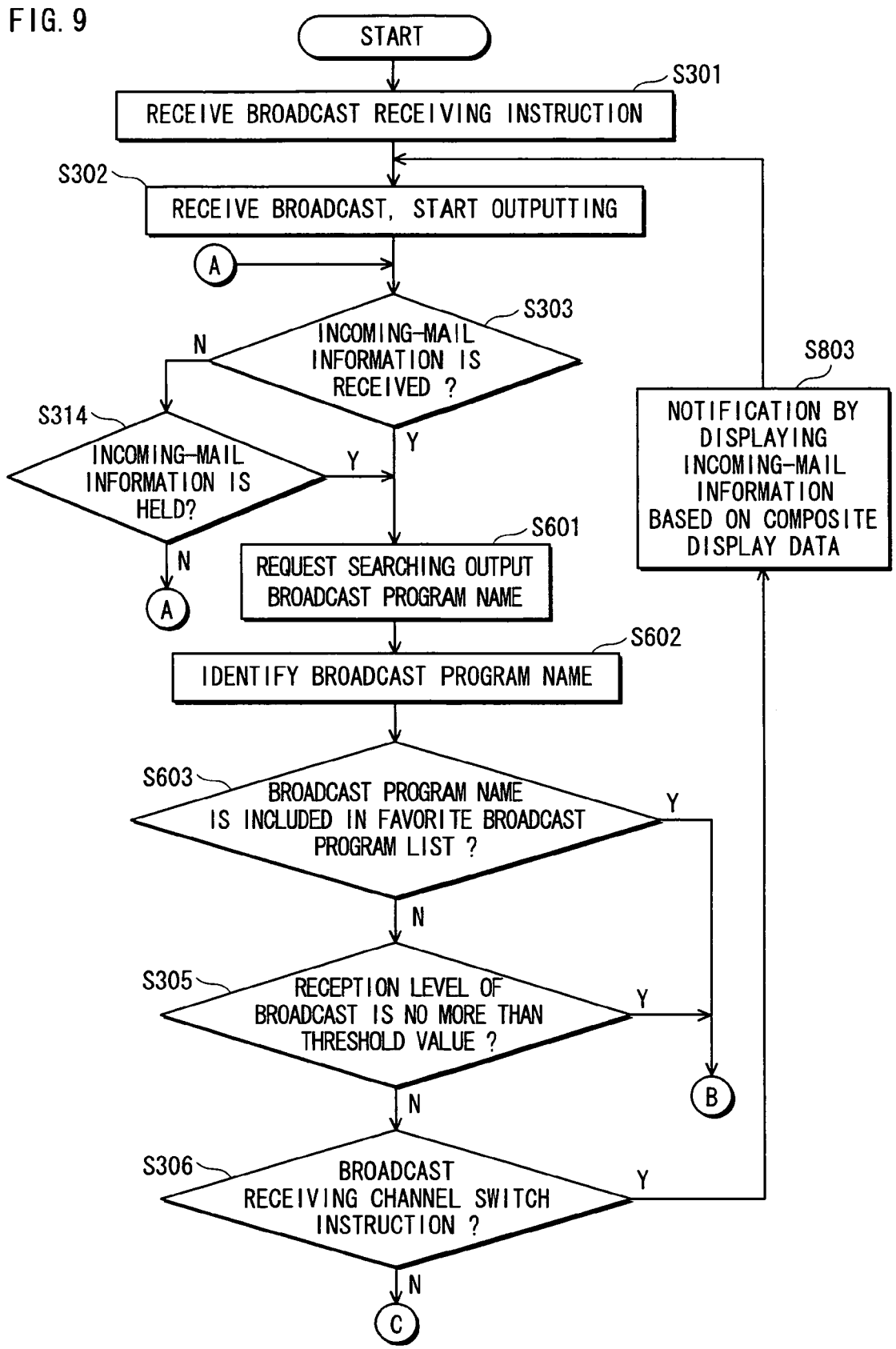
FIG. 9 is a part of a flow chart showing operations of switching control processing of a notification method of incoming-mail information performed by the control unit 215.
Figure 10:
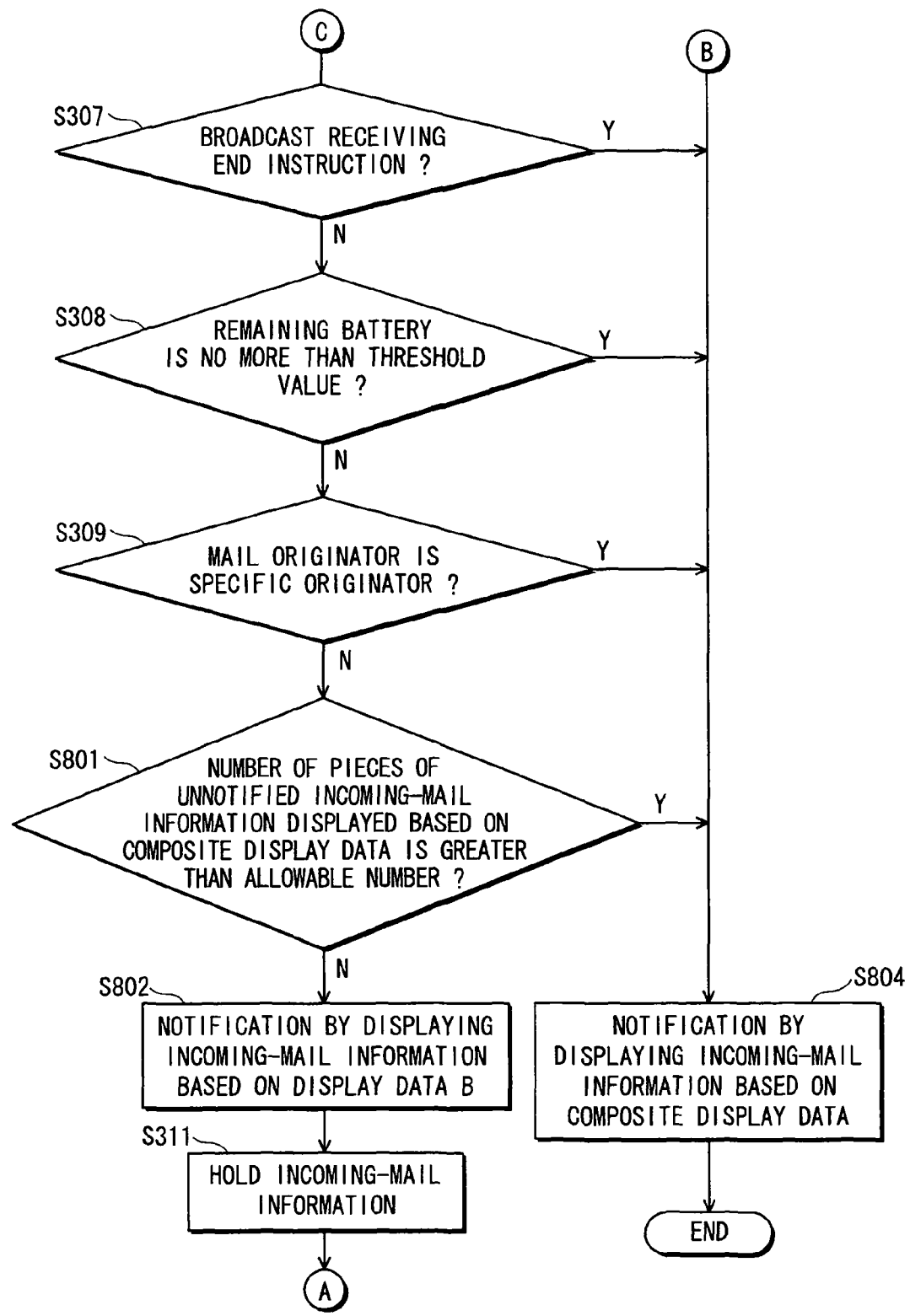
FIG. 10 is a part of the flow chart showing the operations of the switching control processing of the notification method of the incoming-mail information performed by the control unit 215.

FIG. 8 is a flow chart showing operations of switching control processing of the notification method of the incoming-mail information performed by the control unit 115. FIG. 9 and FIG. 10 are flow charts each showing operations of the switching control processing of the notification method of the incoming-mail information performed by the control unit 215.

In FIG. 3 and FIG. 6, the same step number is attached to the same processing as the incoming-mail notification control processing performed by the control unit 115 and the control unit 215 in FIG. 8 to FIG. 10.

The following describes differences between the operations performed by the control unit 115 and the operations performed by the control unit 215, with reference to FIG. 8 to FIG. 10.

In each Step S306 of FIG. 8 and FIG. 9, if a result of the judgment is affirmative (Step S306: Y), the control unit 115 and the control unit 205 each reads the display data A from the memory 106 and the memory 206, respectively. The control unit 115 and the control unit 215 each generates composite display data based on the display data A and the acquired or held incoming-mail information, and outputs the composite display data to the video processing unit 104. The control unit 115 and the control unit 215 each causes each display unit 105 of the mobile phone 100 and the mobile phone 200 to perform display based on the composite display data to provide notification of the incoming-mail information (Step S803).

In each Step S309 of FIG. 8 and FIG. 10, if a result of the judgment is negative (Step S309: N), the control unit 115 and the control unit 205 each judges whether the number of pieces of unnotified incoming-mail information displayed based on the composite display data is greater than the allowable number of display unnotified incoming-mails (each Step S801 in FIG. 8 and FIG. 10). If the number of pieces of unnotified incoming-mail information is no more than the allowable number of display unnotified mails (each Step S801: N in FIG. 8 and FIG. 10), the control unit 115 and the control unit 205 each reads the display data B from the memory 106 and the memory 206, and outputs the read display data B to the video processing unit 104, respectively. The control unit 115 and the control unit 205 each causes each display unit 105 of the mobile phone 100 and the mobile phone 200 to perform display based on the display data B to provide notification of the incoming-mail information (each Step S802 in FIG. 8 and FIG. 10). Then, the processing proceeds to Step S312.

Moreover, in each Steps of S304, S305, and S307 to S309, and S801 of FIG. 8 to FIG. 10, if any one of results of the judgments is affirmative, the control unit 115 and the control unit 205 each reads the display data A from the memory 106 and the memory 206, generates composite display data based on the display data A and the acquired or held incoming-mail information, and outputs the composite display data to the video processing unit 104, respectively. The control unit 115 and the control unit 205 each causes each display unit 105 of the mobile phone 100 and the mobile phone 200 to perform display based on the composite display data to provide notification of the incoming-mail information (Step S804).

Since the processing of Step S301 to Step S309, Step S311, and Step S314 have already been described in the first embodiment, the description is omitted here.

(2) Moreover, a broadcast to be received in the first and second embodiments may be a digital broadcast or an analog broadcast. In the case where a digital broadcast is received, if a broadcast program to be transmitted is a CM broadcast program for example, a CM identification code is attached to a digital broadcast signal to be transmitted in the first embodiment. According to this, the control unit 115 can perform the processing of Step 304 shown in FIG. 3 of the first embodiment, depending on whether the CM identification code is detected in a receiver of the digital broadcast signal. Also, in the second embodiment, a signal for transmitting an electronic program list is extracted from the digital broadcast signal. Based on the electronic program list, the control unit 215 can perform the processing of Step 602 shown in FIG. 6.

(3) Moreover, in the first and second embodiments, the mobile phone 100 and the mobile phone 200 each performs the incoming-mail information notification control processing for television broadcasts. However, the mobile phone 100 and the mobile phone 200 may each perform the same processing for radio broadcasts.

Industrial Applicability

In a mobile phone having a broadcast reception function, the present invention can be used as an art for controlling incoming-mail notification during broadcast reception.

The invention claimed is:

1. A mobile phone, comprising:
a receiving unit operable to receive video data;
a video output unit operable to output the received video data;
a reception detection unit operable to detect reception of a mail;
user instruction reception unit operable to receive, from a user, during the output of the video data by the video output unit, a switching instruction for switching from the video data being output to another video data; and
a notification, control unit operable, in a case where the reception of the mail is detected by the reception detection unit during the output of the video data, when the switching instruction is received by the user instruction reception unit, to provide notification of the reception of the mail together with output of the another video data.

2. The mobile phone of claim 1, further comprising
a judgment unit operable, when the reception of the mail is detected by the reception detection unit, to judge whether a transmission originator of the mail is a specified transmission originator, wherein
in the case where the reception of the mail is detected during the output of the video data, when the transmission originator of the mail is judged to the specified transmission originator by the judgment unit, the notification control unit provides the notification of the reception of the mail even when the switching instruction is not received by the user instruction reception unit.

3. The mobile phone of claim 1, wherein
the user instruction reception unit further receives from the user a termination instruction for terminating the output of the video data, and
in the case where the reception of the mail is detected by the reception detection unit during the output of the video data, when the switching instruction is not received and the termination instruction is received by the user instruction reception unit, the notification control unit provides the notification of the reception of the mail.

4. The mobile phone of claim 1, further comprising
a monitor unit operable to monitor whether a remaining amount of a battery of the mobile phone is no more than a threshold value, wherein
in the case where the reception of the mail is detected by the reception detection unit during the output of the video data, when the remaining amount of the battery is no more than the threshold value, the notification control unit provides the notification of the reception of the mail during the output of the video data.

5. The mobile phone of claim 1, wherein
the receiving unit receives the video data by receiving a broadcast of a channel, and
the switching instruction is an instruction for switching a channel of a broadcast to be received by the receiving unit.

6. A mobile phone, comprising
a receiving unit operable to receive video data;
a video output unit operable to output the received video data;
a reception detection unit operable to detect reception of a mail;
user instruction reception unit operable to receive, from a user, during the output of the video data by the video output unit, a switching instruction for switching from the video data being output to another video data; and
a notification control unit operable, in a case where the reception of the mail is detected by the reception detection unit during the output of the video data, when the switching instruction is not received by the user instruction reception unit, to provide notification of the reception of the mail in a first mode together with output of the video data, and then when the switching instruction is received, to provide the notification in a second mode together with output of the another video data.

7. The mobile phone of claim 6, further comprising
a monitor unit operable to monitor whether a remaining amount of a battery of the mobile phone is no more than a threshold value, wherein
in the case where the reception of the mail is detected by the reception detection unit during the output of the video data, when the remaining amount of the battery is greater than the threshold value, the notification control unit provides the notification of the reception of the mail during the output of the video data in the first mode together with output of the video data, and then when the remaining amount of the battery is no more than the threshold value, the notification control unit provides the notification of the reception of the mail during the output of the video data in the second mode together with output of the video data.

8. The mobile phone of claim 6, wherein
the receiving unit receives the video data by receiving a broadcast of a channel, and
the switching instruction is an instruction for switching a channel of a broadcast to be received by the receiving unit.

* * * * *